(12) United States Patent
Muijs

(10) Patent No.: US 11,790,257 B2
(45) Date of Patent: Oct. 17, 2023

(54) INCIDENT PREDICTION SYSTEM

(71) Applicant: SIGNIFY HOLDING B.V., Eindhoven (NL)

(72) Inventor: Remco Theodorus Johannes Muijs, Meteren (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 858 days.

(21) Appl. No.: 16/062,838

(22) PCT Filed: Dec. 12, 2016

(86) PCT No.: PCT/EP2016/080589
§ 371 (c)(1),
(2) Date: Jun. 15, 2018

(87) PCT Pub. No.: WO2017/102629
PCT Pub. Date: Jun. 22, 2017

(65) Prior Publication Data
US 2019/0026643 A1  Jan. 24, 2019

(30) Foreign Application Priority Data
Dec. 15, 2015  (EP) ................... 15200091

(51) Int. Cl.
| G06F 3/048 | (2013.01) |
| G06N 7/01 | (2023.01) |
| G08B 31/00 | (2006.01) |
| G08B 21/22 | (2006.01) |

(Continued)

(52) U.S. Cl.
CPC ............ *G06N 7/01* (2023.01); *G08B 21/22* (2013.01); *G08B 31/00* (2013.01); *G06N 5/04* (2013.01); *G06Q 50/265* (2013.01)

(58) Field of Classification Search
CPC . G06N 7/005; G06N 5/04; G06N 3/08; G08B 21/22; G08B 31/00; H04W 4/029; G06Q 50/265
See application file for complete search history.

(56) References Cited

U.S. PATENT DOCUMENTS

| 7,558,404 B2 * | 7/2009 | Ma ................. G06K 9/00342 382/103 |
| 8,442,807 B2 * | 5/2013 | Ramachandran ..... H04W 4/025 703/2 |

(Continued)

*Primary Examiner* — Steven B Theriault

(57) ABSTRACT

An incident prediction system and an incident prediction method are provided for predicting an incident. The system comprises a crowd detection interface for receiving a plurality of mobile device identifiers and an incident database wherein a plurality of weight factors is associated with a plurality of stored mobile device identifiers. The weights associated to mobile devices which were present at a site during a previous, historical incident are higher. The system further comprises a prediction subsystem configured for determining a total weight factor at a site to predict an occurrence of an incident. The system and the method may provide information on a composition of a crowd which may help to better prevent incidents from happening. As such, the provided system and method may enable a more effective prediction of incidents compare to currently available systems and methods.

11 Claims, 5 Drawing Sheets

(51) Int. Cl.
 *G06Q 50/26* (2012.01)
 *G06N 5/04* (2023.01)

(56) References Cited

U.S. PATENT DOCUMENTS

| | | | | |
|---|---|---|---|---|
| 8,560,608 | B2* | 10/2013 | Petersen | G06F 16/9535 |
| | | | | 455/457 |
| 8,711,737 | B2* | 4/2014 | Kandekar | H04L 51/14 |
| | | | | 455/456.1 |
| 8,949,164 | B1 | 2/2015 | Mohler | |
| 9,024,757 | B1 | 5/2015 | Miller et al. | |
| 9,121,924 | B2 | 9/2015 | Ng et al. | |
| 9,208,386 | B1* | 12/2015 | Kobold | G06K 9/00778 |
| 9,374,675 | B2* | 6/2016 | Fletcher | H04W 4/029 |
| 9,420,424 | B2* | 8/2016 | Ghose | H04W 4/023 |
| 9,497,585 | B1* | 11/2016 | Cooley | H04W 4/02 |
| 9,503,873 | B1* | 11/2016 | Yadav | H04W 4/08 |
| 9,826,353 | B2* | 11/2017 | Venkatraman | H04W 4/021 |
| 10,255,352 | B1* | 4/2019 | Xu | G06Q 50/01 |
| 2003/0065805 | A1* | 4/2003 | Barnes, Jr. | H04L 63/107 |
| | | | | 709/244 |
| 2006/0178860 | A1* | 8/2006 | Glass, III | G06N 3/004 |
| | | | | 703/6 |
| 2007/0103294 | A1* | 5/2007 | Bonecutter | G08B 25/10 |
| | | | | 340/539.18 |
| 2007/0142065 | A1* | 6/2007 | Richey | H04W 4/029 |
| | | | | 455/457 |
| 2008/0016018 | A1* | 1/2008 | Malik | H04W 8/18 |
| | | | | 706/46 |
| 2008/0094230 | A1* | 4/2008 | Mock | G08B 31/00 |
| | | | | 340/573.4 |
| 2010/0198917 | A1* | 8/2010 | Petersen | H04L 67/306 |
| | | | | 709/204 |
| 2011/0191284 | A1* | 8/2011 | Dalton | G06N 5/02 |
| | | | | 706/58 |
| 2012/0066138 | A1* | 3/2012 | Curtis | H04W 4/21 |
| | | | | 705/319 |
| 2012/0268269 | A1 | 10/2012 | Doyle | |
| 2012/0295618 | A1* | 11/2012 | Ahmavaara | H04W 8/02 |
| | | | | 455/435.1 |
| 2013/0059608 | A1* | 3/2013 | Cuff | H04L 67/22 |
| | | | | 455/456.5 |
| 2013/0157684 | A1* | 6/2013 | Moser | H04W 4/023 |
| | | | | 455/456.1 |
| 2014/0066089 | A1* | 3/2014 | Monks | H04W 4/00 |
| | | | | 455/456.1 |
| 2014/0095425 | A1* | 4/2014 | Sipple | G06N 7/005 |
| | | | | 706/52 |
| 2014/0282641 | A1* | 9/2014 | Fry | H04N 21/44218 |
| | | | | 725/10 |
| 2015/0160035 | A1* | 6/2015 | Longo | G01S 5/02 |
| | | | | 701/423 |
| 2015/0186378 | A1* | 7/2015 | Berlingerio | H04L 51/30 |
| | | | | 707/748 |
| 2015/0227851 | A1* | 8/2015 | Kaisser | G06N 5/02 |
| | | | | 706/12 |
| 2015/0235379 | A1* | 8/2015 | O'Gorman | G06T 7/269 |
| | | | | 382/103 |
| 2015/0249904 | A1* | 9/2015 | Weiss | H04W 4/023 |
| | | | | 455/456.1 |
| 2015/0304815 | A1* | 10/2015 | Ghose | H04W 4/023 |
| | | | | 455/456.3 |
| 2015/0310371 | A1* | 10/2015 | Byrne | G06Q 10/06393 |
| | | | | 705/7.39 |
| 2016/0034712 | A1* | 2/2016 | Patton | G06F 16/48 |
| | | | | 726/28 |
| 2016/0063144 | A1* | 3/2016 | Cooke | G06F 30/20 |
| | | | | 703/2 |
| 2016/0092469 | A1* | 3/2016 | Mukherjee | G06Q 10/10 |
| | | | | 705/325 |
| 2016/0135015 | A1* | 5/2016 | Fletcher | H04W 4/30 |
| | | | | 455/456.2 |
| 2016/0140984 | A1* | 5/2016 | Cecchi | G10L 25/63 |
| | | | | 704/274 |
| 2016/0261984 | A1* | 9/2016 | Shrinath | H04W 4/021 |
| 2016/0366573 | A1* | 12/2016 | Johnson | H04W 4/021 |
| 2017/0075407 | A1* | 3/2017 | Kritt | G06F 1/3209 |
| 2017/0103172 | A1* | 4/2017 | Fink | G06N 3/086 |
| 2017/0161614 | A1* | 6/2017 | Mehta | G06N 20/00 |
| 2020/0342116 | A1* | 10/2020 | Agarwal | G06F 21/577 |
| 2021/0173937 | A1* | 6/2021 | Vargas | G06F 21/552 |

* cited by examiner

INCIDENT PREDICTION SYSTEM

CROSS-REFERENCE TO PRIOR APPLICATIONS

This application is the U.S. National Phase application under 35 U.S.C. § 371 of International Application No. PCT/EP2016/080589, filed on Dec. 12, 2016, which claims the benefit of European Patent Application No. 15200091.5, filed on Dec. 15, 2015. These applications are hereby incorporated by reference herein.

FIELD OF THE INVENTION

The invention relates to an incident prediction system and an incident prediction method based on analysis of recorded data at a vicinity of an incident. The invention further relates to a computer program product comprising instructions for causing a processor system to perform the method.

BACKGROUND OF THE INVENTION

Diverse urban sensors offer the potential of acquiring contextual information that form the basis for novel data-driven city services. A key source of urban information is provided by automatic or semi-automatic detection of incidents, which is being increasingly adopted by surveillance systems. Surveillance systems that are widely deployed to monitor the public in city centers, shopping malls or cultural sites, etc., are becoming increasingly intelligent. Examples include the detection of vehicles driving in the wrong direction, parking in prohibited locations and the detection of vandalism, theft and aggressive behavior. Incident detection may assist human staff operating security systems to handle vast amounts of acquired data and respond adequately. It is noted, however, that the capabilities of most systems are confined to detection of incidents when they occur, while prediction of relevant incidents over a meaningful time span such that precautionary measures can still be taken, is often desirable.

U.S. Pat. No. 8,949,164 B1 describes a predictive policing system including a crime prediction server constructed to process historical crime data using a crime forecasting algorithm to produce a crime forecast assigning a geographic region to a crime type for use in crime prevention, deterrence, and disruption practices. The predictive policing system comprises a crime prediction processing device constructed to carry out a set of one or more instructions to receive a historical crime report including a set of historical crime data corresponding to a plurality of criminal events. The system produces a predictive crime forecast assigning a discrete geographic region to a crime type.

A problem of the system of U.S. Pat. No. 8,949,164 B1 is that it is insufficiently effective in predicting an incident as it solely relies on historical crime data.

SUMMARY OF THE INVENTION

It would be advantageous to have a system or method for enabling a more effective prediction of an incident.

To better address this concern, a first aspect of the invention provides an incident prediction system, the system comprising:
- a crowd detection interface for receiving a plurality of mobile device identifiers of a plurality of mobile devices from a crowd detection unit;
- an incident database wherein a plurality of weight factors is associated with a plurality of stored mobile device identifiers;
- a prediction subsystem configured for:
  i) identifying one or more matches between at least one of the received mobile device identifiers and stored mobile device identifiers to obtain one or more weight factors associated with the received mobile device identifiers,
  ii) totaling the one or more weight factors so as to obtain a total weight factor,
  iii) generating prediction data of an occurrence of the incident based on the total weight factor.

The present invention is based on an insight of the inventor that using a combination of stored data related to past incidents and data related to mobile devices present at a region enable a more effective predicting of an incident in that region. The inventor has recognized that an important source of information may be represented by the number of people present in a designated area, their composition, their movement and derivative attributes. Such information may be acquired by monitoring the presence of connected devices such as smartphones, tablets and smart watches on the basis of, e.g., the electromagnetic (EM) signals they emit, e.g. Bluetooth, wifi, cellular, etc. By analyzing these data sources and stored data related to mobile devices present in the past incidents, particular mobile devices which may have been associated with past incidents and are currently present in a particular region may be detected. Such analysis may advantageously assist in, for example, identifying presence of individuals or groups of known or notorious trouble makers in a region prior to an occurrence of an incident in that region. As such, an incident may be advantageously predicted such that precautionary measures can still be taken over a meaningful time span. Law enforcement officers may thus be more effectively informed about a composition of the crowd they monitor in a region and use such information to better prevent actual incidents from happening. As such, the system and the method as claimed enable a more effective predicting of incidents.

The weight factors are computed based on a proximity of the associated mobile devices to at least one historic incident occurred in the past. For example, a larger weight factor may be associated to mobile devices that have been in a relatively close distance from past incidents. For example, when the associated mobile devices have been detected to be within a pre-determined range of distances to a past incident, the weight factor may be increased accordingly and proportionally. In a further example, when the number of past incidents at which a mobile device has been present increases, the associated weight factor may be increased accordingly. It is noted that, herein, a proximity to a historic incident may be defined based on a distance from a position or region at which an incident has occurred. The position of the incident may be defined, for example, as a center of a circle with a pre-defined radius, drawn around a certain area at which the incident has occurred.

US2012/0268269 A1 discloses a device that obtains one or more first attributes to a first person that is associated with a first mobile device, obtains one or more second attributes to a second person that is associated with a second mobile device, determines the location of the first and second person, and generates a thread score of the first person with respect to the second person based on the first and second attributes and the locations of the first and second person.

US2008/0094230A1 discloses a system for warning a mobile device user of potential danger by determining the position of the mobile device relative to a zone of danger, by calculating a situational threat value based on e.g. distance to and the trust level of a certain person.

Optionally, the incident database incorporates geographical data indicative of geographical regions of the historic incidents, and the weight factors are computed based on the geographical regions of the historic incidents. For example, larger weight factors may be assigned to associated mobile devices which have been present in particular or critical regions of a city.

Optionally, the crowd detection interface obtains location data from the crowd detection unit, the location data being indicative of locations of the mobile devices, and the prediction subsystem is configured to total the weight factors in a pre-determined geographical region. Advantageously, detection of incidents in a desired pre-determined region may be effectively anticipated based on, for example, real-time movement of the mobile devices in that pre-determined region. This may help, for example, to have a regional-dependent evaluation of the weight factors. Regional-dependent warning signals may be advantageously generated based on the regional-dependent evaluation of the weight factors.

Optionally, the prediction subsystem is further configured for generating a visual geographical map based on the location data for visually presenting the location of the mobile devices on the visual geographical map. A visual geographical map on which the location of the mobile devices are presented may advantageously help to, for example, effectively correlate geographical information, e.g., roads and buildings when predicting incidents. Accordingly, preventive measures may be as such, more effectively taken based on the correlated geographical information.

Optionally, the prediction subsystem is further configured for modifying the total weight factor by at least one situational weight factor, the situational weight factor being calculated based on one from the list of: weather conditions, day or night time, weekdays, period of a city event and type of a city event. This may advantageously help in predicting the occurrence of incidents more affectively. For example, if an increasing number of mobile device identifiers is detected at night at a certain area, e.g., a shopping center which is supposed to be closed at night, a larger risk of the occurrence of an incident may be considered by, e.g., multiplying the weight factor with the situational weigh t factor to take the time into account.

Optionally, the prediction subsystem is further configured for: i) associating default weight factors to the received mobile device identifiers that do not match with any of the stored mobile device identifiers, and ii) totaling the weight factors of the received mobile device identifiers to obtain the total weight factor. The default weight factor may, for example, be the value 1 for each non-stored mobile device identifier. As such, for each non-stored mobile device identifier, a weight factor of 1 may be added to the total weight factor. As such, the number of mobile devices present in a region may be taken into account. This may be advantageous in predicting incidents, for example, based on an unusual number of mobile devices, e.g., crowding in a particular region, even though no large weight factors have previously been associated with mobile devices in the database.

Optionally, the prediction subsystem is further configured for generating a warning signal if a probability of the occurrence of the incident is larger than a pre-defined incident probability threshold. This may advantageously assist, for example, in drawing attention of police officers who are monitoring multiple region to a particular region in which the risk of the occurrence of an incident is high.

Optionally, the crowd detection interface receives the plurality of mobile device identifiers in the form of at least one selected from the list of: wireless signals emitted by the plurality of mobile devices, device MAC addresses and SSIDs of networks the device has been connected to.

Optionally, the system comprises the crowd detection unit and the crowd detection unit is a connected lighting system equipped with a plurality of sensors for receiving the plurality of mobile device identifiers. Advantageously, high density of powered, connected nodes and an ubiquitous nature of lighting systems may be beneficially used for the collection of, for example, contextual city information such as mobile devices present in a region of the city.

Optionally, the weight factors are calculated as a function of the maximum of a default weight factors and $$\left(\frac{c_r}{((x_i - x_{k,l})^2 + (y_i - y_{k,l})^2)}\right),$$

wherein $c_r$ is a spatial normalization factor, $(x_i, y_i)$ represents coordinates of a historic incident l and $(x_{k,l}, y_{k,l})$ represents coordinates of an associated mobile device k.

Optionally, the weight factors are obtained from an initial weight factor and a time decay factor. This may advantageously help in taking into account the presence of mobile device at old incidents which occurred long time ago, e.g., months or years ago. As such, a positive bias to recent incidents may be introduced versus incidents that occurred longer ago.

Optionally, the weight factors are periodically reduced to a default weight factor. This may advantageously enable to gradually eliminate a safety hazards risk associated to people who may have been coincidentally close to an incident once.

In a further aspect of the invention, an incident prediction method is provided, the method comprising:
receiving a plurality of mobile device identifiers of a plurality of mobile devices;
associating a plurality of weight factors to a plurality of stored mobile device identifiers, wherein the weight factors are computed based on a proximity of the associated mobile devices to at least one historic incident that occurred in the past;
identifying one or more matches between at least one of the received mobile device identifiers and stored mobile device identifiers so as to obtain one or more weights factors associated with the received mobile device identifiers,
totaling the one or more weight factors so as to obtain a total weight factor,
generating prediction data representing a probability of an occurrence of the incident based on the total weight factor.

In a further aspect of the invention, a computer program product is provided comprising instructions for causing a processor system to perform the method.

It will be appreciated by those skilled in the art that two or more of the above-mentioned embodiments, implementations, and/or aspects of the invention may be combined in any way deemed useful.

Modifications and variations of the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
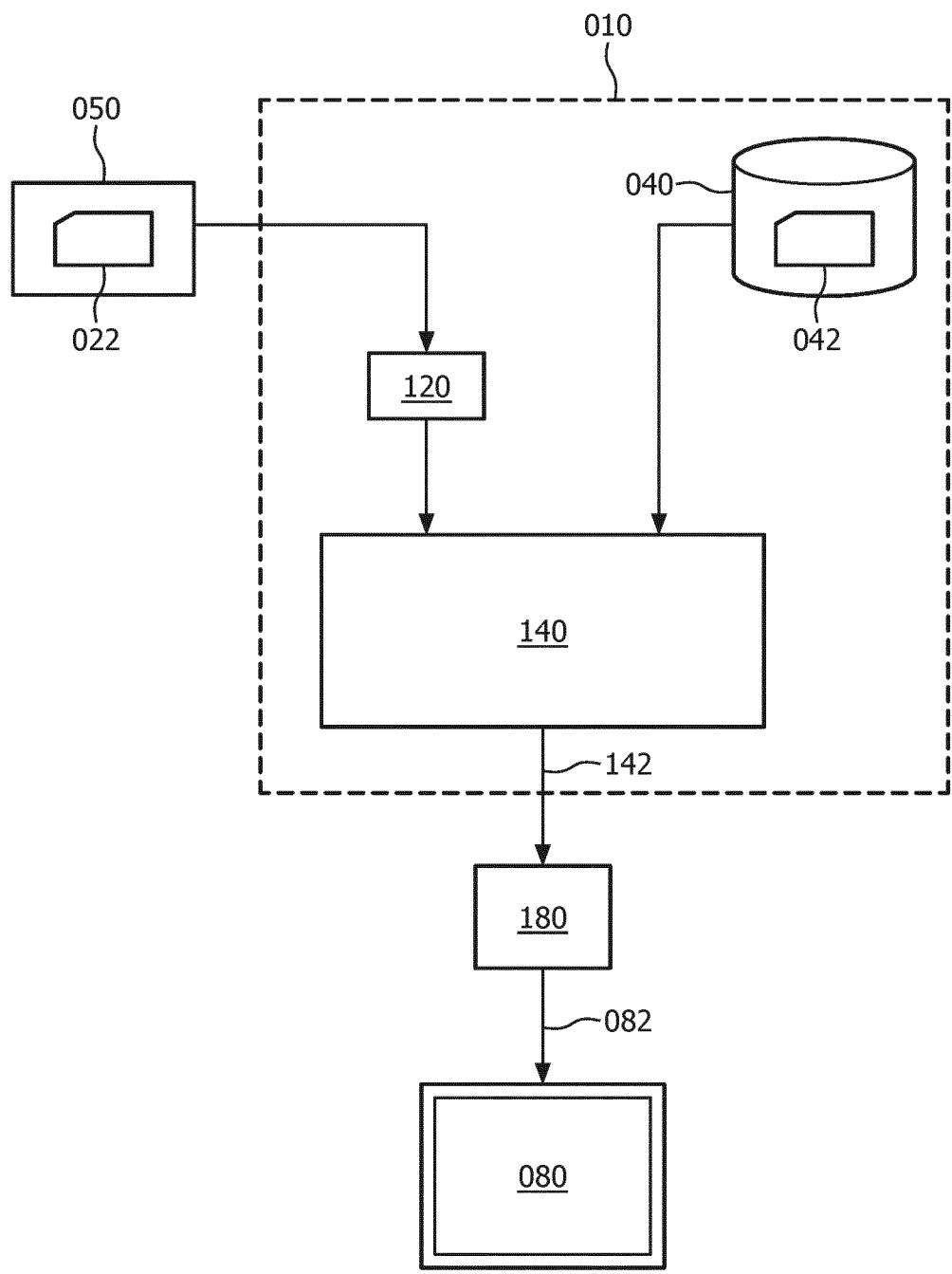
FIG. 1 shows an incident prediction system.

FIG. 1 shows an incident prediction system 100. The system 100 comprises a crowd detection interface 120, an incident database 040 and a prediction subsystem 140.

The crowd detection interface 120 may be configured for receiving a plurality of mobile device identifiers 022 of a plurality of mobile devices from a crowd detection unit 050. It is noted that mobile devices such as smartphones, tablets, smart watches, laptops, etc., which may be carried by people may emit diverse types of electromagnetic signals, such as Bluetooth, wifi, cellular data, etc. The crowd detection unit 050 may, for example, pick up the signals by deploying passive or active detectors and thereby detect the plurality of mobile device identifiers 022 and send the signals identifiers 022 to the crowd detection interface 120. It is noted that even when the mobile devices such as phones are not associated to a network, they may regularly sent out probe requests to identify available networks in their vicinity. These probe requests may reveal device MAC address and/or SSIDs of networks the device has previously connected to. When devices are associated to a certain network, the amount of traffic may be substantially higher and hence the amount of detectable messages may rise accordingly. Such information may be collected by deploying passive sniffers in the environment, by appropriate network infrastructure, e.g., access points installed to provide wireless internet access to a site, etc. As such, the crowd detection unit 050 may comprise detectors, e.g., sensors which may detect the plurality of mobile device identifiers 022 and send the corresponding data to the crowd detection interface 120. It is noted that the crowd detection unit 050 may detect and send data in real-time, e.g., within a time threshold, wherein the time threshold may be, e.g., 1 second, 10 second, 1 minute, 5 minutes or more.

The crowd detection unit 050 may comprise a surveillance subunit to obtain crowd-related information, in general, such as data representing signals received from the mobile devices indicative of the mobile device identifiers 022. Various types of surveillance subunits may be used to collect and provide crowd-related data. The crowd-related data may provide data related to the mobile devices, e.g., mobile device identifiers 022 and location data indicative of locations of the mobile devices. The crowd-related data may further provide other data, e.g., behavioral data indicative of a behavior of individuals holding the mobile devices such as movement behavior, sound level, etc.

It is noted that the crowd-related data may be transmitted to the crowd detection interface 120 wirelessly. For example, each sensor of the crowd detection unit 050 may be coupled to a corresponding wireless transmitter that is capable of transmitting the sensor signals generated by respective sensors to the crowd detection interface 120 directly or indirectly. In an example, the crowd detection interface 120 may comprise a wireless receiver that is coupled to the sensors and this wireless receiver may be capable of receiving all the transmitted sensor signals from the different sensors of the crowd detection unit 050. In a further examples, several sensors of the crowd detection unit 050 may comprise a transceiver for receiving and transmitting sensor signals such that these transceivers may be positioned in between the receiver of the crowd detection interface 120 and a specific sensor that is positioned far away. Then the transceiver may receive the sensor signals of the specific sensor being positioned far away and may forward this sensor signal towards the crowd detection interface 120. For example, an ad hoc network may be formed between the transmitters, transceivers and receiver allowing the coverage of a relatively large area. In another example, the sensor signals may not be transmitted wirelessly to the crowd detection interface 120, but they may also be transmitted via wires. For example, power line modems can be used to transmit the sensor signals via power lines that provide power to the sensors.

The incident database 040 may comprise a plurality of weight factors assigned to a plurality of stored mobile device identifiers 042. The incident database 040 may have been generated based on co-localization between historic incidents occurred in the past and mobile devices present at a vicinity of scenes of the historic incidents. As such, the weight factors may be also referred to as co-localization weight factors. For example, a larger weight factor may be associated to mobile device identifiers of which the associated mobile devices have been recorded to be in a relatively close distance from past incidents. In another example, when the associated mobile devices have been, e.g., recorded to be more than once in a pre-determined range of distances to a past incident, a larger weight factor may be given to the associated mobile device identifier accordingly and proportionally. In a non-limiting example, for each historic incident, all mobile devices within a configurable minimum distance range may be identified. The minimum distance may be considered, for example, to be 1 meter, 10 meter, 100 meter, 500 meter or more.

It is noted that the incident database 040 may incorporate geographical data indicative of geographical regions of the historic incidents, and the weight factors may be computed based on the geographical regions. For example, larger weight factors may be assigned to associated mobile devices which have been present in particular or critical regions of a city, e.g., city center, shopping centers, sport stadiums, foreign embassies, etc.

It is noted that other types of data in relation to the mobile devices and/or incidents may be stored in the database 040 as well. For example, a time duration that a mobile device has been present in an historic incident area or on-line or off-line communications that the mobile device has made during that period may be have been recorded and stored in the database 040.

It is noted that, in general, data received from the crowd detection unit 050 and data stored in the incident database 040 may be hashed. Methods for hashing data are known in the art per-se. Known cryptographic hash functions and algorithms may be used.

It is further noted that data related to the past indicants and stored mobile device identifiers may have been recorded by, e.g., a recording system embedded in a surveillance units installed in the area at which the past incidents have occurred and the surveillance units may feed the database 040 of historic incidents. Incidents may have been automatically detected by the surveillance units or may have been reported by people present on a scene. For example, bystanders running an app that allows them to connect to a municipality or a local operator may report an incident. For example, passengers in a train may report violence together with their location information. The incidents may also be registered by authorized staff themselves. For example, police officers on the street or backend coordinators may register events that have been resolved with an adequate timestamp and position label in the incident database 040.

It is noted that relevant information, e.g., mobile device location information may be shared by the users themselves in a participatory scheme. For example, users may install an app on their mobile device and accept location information to be shared with its distributor. This approach may be for example adopted by some venue operators and event organizers that distribute an app providing information with information about for example who is playing where, traffic, seating or maps. In exchange, the users may accept to share information about their whereabouts and such information may be aggregated in a backend of the operator.

The prediction subsystem 140 may be configured for identifying a match between at least one of the received mobile device identifiers 022 and a stored mobile device identifier stored in the database 040 so as to obtain an identified mobile device identifier. To identify the match, a table look-up approach, which is known in the art per se, may be used. The prediction subsystem 140 may be further configured for totaling the weight factor of the one or more identified mobile device identifiers so as to obtain a total weight factor.

It is noted that, in general, besides the weight factors of one or more identified mobile device identifiers, the total weight factor may include weight factors for all the received mobile device identifiers so as to account for a total number of mobile devices present in a region when predicting an incident in that region. For example, the prediction subsystem 140 may be configured for associating default weight factors to the received mobile device identifiers that do not match any of the stored mobile device identifiers. In this manner, each unique mobile device identifier may be assigned a default value, e.g., 1.0, when the mobile device identifier has not been recorded before in the database 040. The prediction subsystem 140 may then total the weight factors of the received mobile device identifiers to obtain the total weight factor.

The prediction subsystem 140 may be further configured for generating prediction data 142, e.g., representing a probability of an occurrence of the incident based on the total weight factor. It is noted that the prediction data 142 may be presented to a user in various forms. In the non-limiting example of FIG. 1, the prediction subsystem 140 is shown to comprise a display output 180 for providing display data 082 comprising prediction data to a display 080. It is noted that the prediction subsystem 140 may be further configured for generating a warning signal if a probability of the occurrence of the incident is larger than a pre-defined incident probability threshold. It is noted that the prediction subsystem 140 may be configured to select, among a plurality of pre-determined geographical regions, a geographical region with highest total weight factor and generate a warning signal for the selected geographical region.

It is noted that the system 100 may comprise one or more microprocessors which execute appropriate software. The software may have been downloaded and/or stored in a corresponding memory, e.g., a volatile memory such as RAM or a non-volatile memory such as Flash. Alternatively, the functional units of the system may be implemented in the device or apparatus in the form of programmable logic, e.g., as a Field-Programmable Gate Array (FPGA). In general, each functional unit of the system 100 may be implemented in the form of a circuit. It is noted that the system 100 may also be implemented in a distributed manner, e.g., involving different devices or apparatuses. For example, the distribution may be in accordance with a client-server model.

Figure 2:
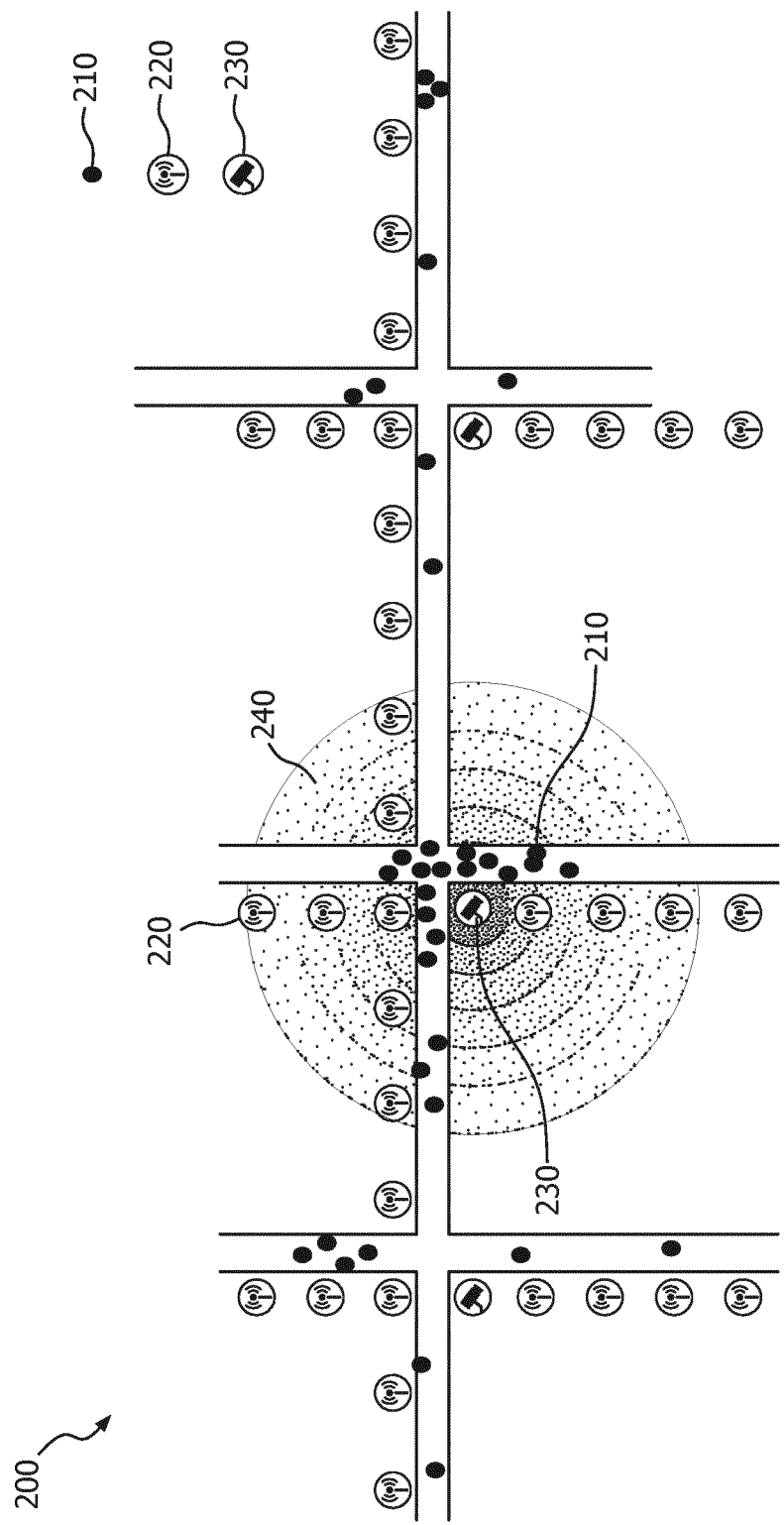
FIG. 2 shows a schematic visual map generated by the system of FIG. 1 showing a density map representing weight factors associated with mobile devices present in a geographical region.

FIG. 2 shows a schematic visual map 200 generated by the system 100 of FIG. 1 showing a density map 240 representing weight factors associated with mobile devices 210 present in a geographical region. Crowd-related data such as data representing signals received from the mobile devices 210 indicative of the mobile device identifiers may be collected by the detectors 220 of the crowd detection unit 050 of FIG. 1.

It is noted that the crowd detection unit 050 of FIG. 1 may comprise a surveillance subunit which may further feed data related to past incidents to the database 040 of FIG. 1. In the non-limiting example of FIG. 2, the crowd detection unit 050 of FIG. 1 is shown to comprise a camera-based surveillance subunit 230. The camera-based surveillance subunit 230 may comprise a video processing circuit and may deploy intelligent edge- or server-based computer vision analytics. The surveillance subunit 230 may, for example, use motion tracking and analysis, as this may be characterized by relatively fast and erratic/irregular motion patterns. In another example, the surveillance subunits 230 may comprise a microphone and an audio processing circuit to which the microphone is coupled, integrated in CCTV systems or stand-alone, which may allow crowd detection based on acoustic analysis. In this case, aggressive behavior may be revealed by large volumes (shouting) as well as the pitch/frequency content of the signals with respect to the background. As an example, the Dutch company Soundintel provides software modules for audio-based aggression detection that may be integrated with many common audio-enabled CCTV systems.

Figure 3:
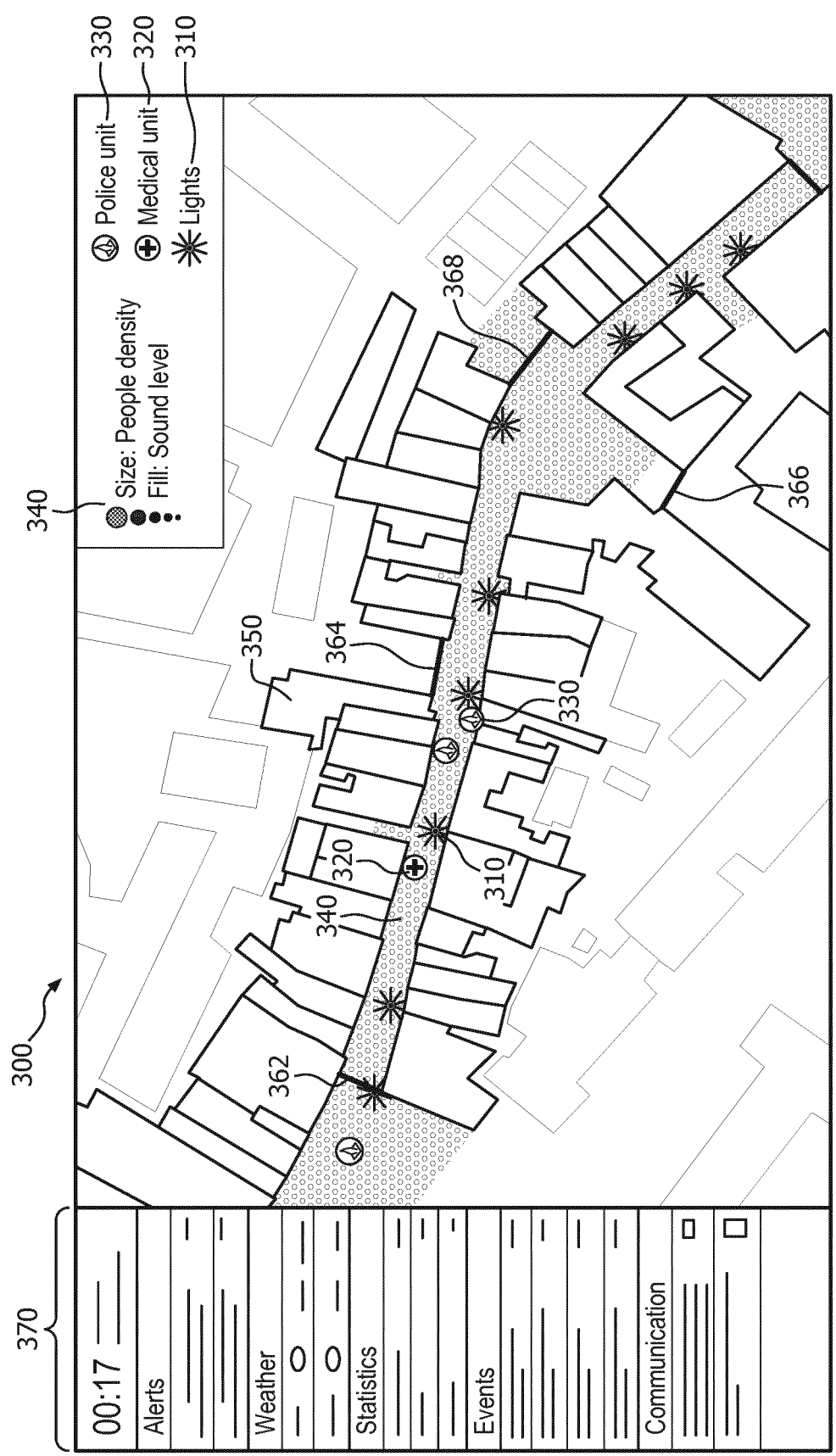
FIG. 3 shows another schematic visual map generated by the system of FIG. 1 showing a density map of mobile device identifiers detected by sensors embedded in a connected lighting system in a geographical region comprising buildings and streets.

FIG. 3 shows another schematic visual map 300 generated by the system 100 of FIG. 1 showing a density map 340 of mobile device identifiers detected by sensors embedded in a connected lighting system 310 in a geographical region comprising buildings 350 and streets 362-368. It is noted that the system 100 of FIG. 1 may comprise the crowd detection unit 050. In the non-limiting example of FIG. 3, the crowd detection unit is shown to be the connected lighting system 310. It is further noted that the visual map 300 may further indicate other desired information, e.g., locations of police unites 330 and medical units 320 present in the region. Such information may be advantageously used to take necessary measures before an incident happens.

The prediction subsystem 140 of FIG. 1 may be configured for multiplying the total weight factor by at least one situational weight factor, the situational weight factor being calculated based on at least one from the list of: weather conditions, day or night time, weekdays, period of a city event and type of a city event. The non-limiting example of FIG. 3 shows that the visual map 300 may present situational information 370 indicating, e.g., time, weather condition, etc.

Figure 4:
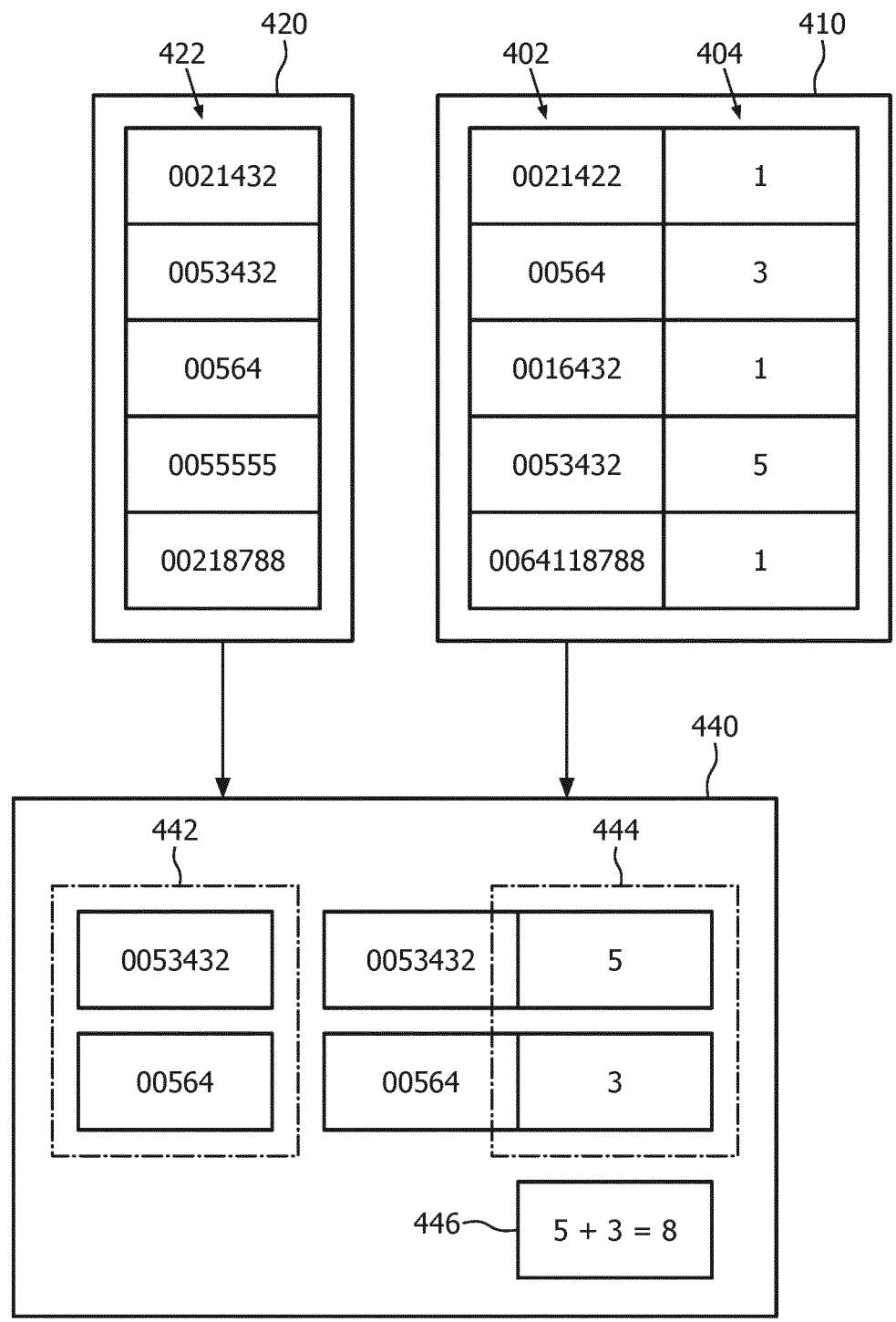
FIG. 4 shows an example of the incident database, the crowd detection interface and the incident prediction subsystem of FIG. 1, indicating a totaling of the weight factors associated with the identified mobile device identifiers obtained from the crowd detection interface which matches the stored mobile device identifiers of the incident database.

FIG. 4 shows an example of the incident database 410, the crowd detection interface 420 and the incident prediction subsystem 440 of FIG. 1, indicating an example of a totaling 446 of the weight factors 444 associated with the identified mobile device identifiers 442 obtained from the crowd detection interface 420 which match the stored mobile device identifiers 402. In the non-limiting example of FIG. 4, the prediction subsystem 440 is shown to identify two matches between the stored mobile device identifiers 402 of the incident database 410 and the received mobile device identifiers 422 of the crowd detection interface 420. When such matches are recognized, the incident prediction subsystem 440 is shown to select and total, among the weight factors 404 associated with the stored mobile device identifiers 402 of the database 410, the weight factors 444 corresponding to the identified mobile device identifiers 442. The embodiment may be extended by, e.g., accounting for, e.g., a region or position of the received mobile device identifiers 422.

It is noted that, referring to FIGS. 1-4 in general, for a mobile device identifier, a weight factor may be computed as a function $f$ of the distance to the historic incident using, e.g., the formula:

$$w_{k,l} = f(x_i - x_{k,l}, y_i - y_{k,l})$$

where $w_{k,l}$ represents the weight factor for device identifier k based on historic incident l, and $(x_i, y_i)$ and $(x_{k,l}, y_{k,l})$ may represent the coordinates of the historic incident l and of an associated mobile device k at the time of historic incident l, respectively.

The function $f$ may be, for example, defined inversely proportional to the distance between the device and the incident. In a non-limiting example, the function $f$ may be defined as a function of the maximum of a default weight factors, e.g., 1 and $$\left( \frac{c_r}{((x_i - x_{k,l})^2 + (y_i - y_{k,l})^2)} \right),$$

wherein $c_r$ may be a spatial normalization factor which may determine a pre-determined distance to the historic incident l.

It is noted that when mobile devices are detected in the vicinity of a detected or reported incident, their co-localization weight may be temporarily raised and then decay over time. For each mobile device identifier, the database may apply the assigned weight factor and maintain a current status. This may be achieved in diverse ways, such as maintaining a running average or a time-recursive filter. For example:

$$W_l = \min(1, c_{decay} * W_l + w_{k,l})$$

where $c_{decay}$ represent a temporal decay factor that may prevent that very old events are included indefinitely. It may be advantageous to aggregate the weight factors using multiple time filters $c_{decay}$, to prioritize, e.g., incidents earlier the same evening or week and distinguish against long-term incident proximity. It is noted that the database may be updated in different manners and at different time intervals. For example, at regular time intervals, e.g., once every day to update all entries in the database by applying the temporal decay factor $c_{decay}$. The $c_{decay}$ may have values, e.g., 0.99, smaller than a default value, e.g., 1.0. Applying the temporal decay may enable that over time, all weights gradually return to a default value, e.g. 1.0, such that people who have been coincidentally close to incidents once are not regarded as safety hazards for a long period, e.g., several months or years. In such cases, the weight factor may be defined as, e.g. $W_l = \min(1, c_{decay} * W_l)$. It is noted that the database may be updated at other time intervals, e.g., upon processing a new incident which may be detected by the system, reported by officers, etc. In such cases, a new weight $w_{k,l}$ corresponding the new entries related to a newly occurred incident may be added in the database.

Figure 5:
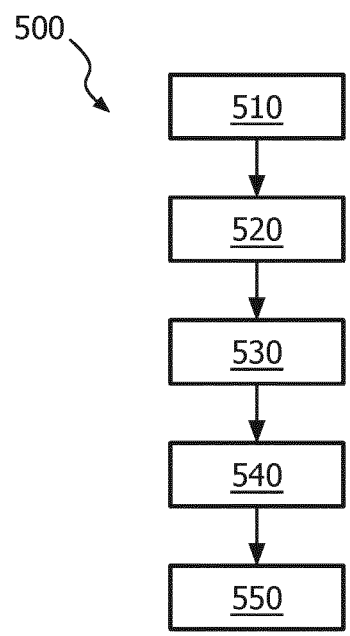
FIG. 5 shows an incident prediction method.

FIG. 5 shows an incident prediction method 500. The method 500 comprises, in an operation titled "RECEIVING IDENTIFIERS", receiving 510 a plurality of mobile device identifiers of a plurality of mobile devices. The method 500 further comprises, in an operation titled "ASSIGNING WEIGHT FACTORS", associating 520 a plurality of weight factors with a plurality of stored mobile device identifiers. The method 500 further comprises, in an operation titled "IDENTIFYING A MATCH", identifying 530 one or more matches between at least one of the received mobile device identifiers and stored mobile device identifiers to obtain one or more weight factors associated with the received mobile device identifiers. The method 500 further comprises, in an operation titled "TOTALING WEIGHT FACTOR", totaling 540 the one or more weight factors so as to obtain a total weight factor. The method 500 further comprises, in an operation titled "GENERATING PREDICTION DATA", generating 550 prediction data of an occurrence of the incident based on the total weight factor. It is noted that the method 500 may, but does not need to, correspond to an operation of the system 100 as described with reference to FIG. 1.

It will be appreciated that the above operation may be performed in any suitable order, e.g., consecutively, simultaneously, or a combination thereof, subject to, where applicable, a particular order being necessitated, e.g., by input/output relations.

Figure 6:
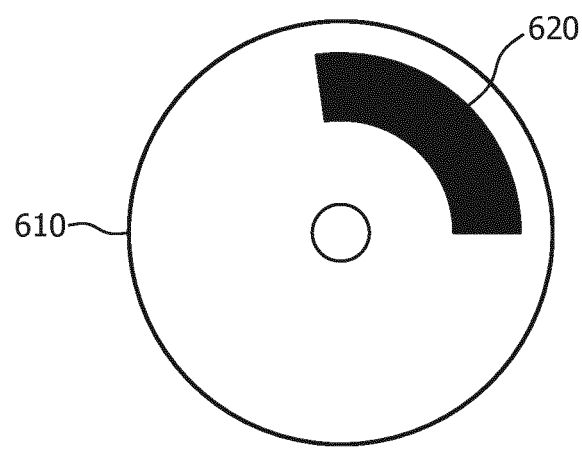
FIG. 6 shows a computer program product comprising instructions for causing a processor system to perform the method.

The method 500 may be implemented on a computer as a computer implemented method, as dedicated hardware, or as a combination of both. As also illustrated in FIG. 6, instructions for the computer, e.g., executable code, may be stored on a computer readable medium 610, e.g., in the form of a series 620 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 5 shows an optical disc 610.

It will be appreciated that, in accordance with the abstract of the present application, an incident prediction system and an incident prediction method are provided for predicting an incident. The system comprises a crowd detection interface for receiving a plurality of mobile device identifiers. The system further comprises an incident database wherein a plurality of weight factors is associated with a plurality of stored mobile device identifiers. The system further comprises a prediction subsystem configured for identifying one or more matches between at least one of the received mobile device identifiers and stored mobile device identifiers. The prediction subsystem is further configured for totaling the one or more weight factors so as to obtain a total weight factor to predict an occurrence of the incident. The system and the method may provide information on a composition of a crowd which may to better prevent incidents from happening. As such, the provided system and method may enable a more effective prediction of incidents compare to currently available systems and methods.

It is noted that according to the above, whenever an incident is detected or reported, the incident proximity weight factor for mobile device identifiers that are detected as being close to the incident may be updated. Devices that are often seen close to incidents may be earmarked. Observed clusters of such devices may be used to provide warning signals to police or security staff monitoring the situation and take preventative measures if deemed necessary. The sensors may be, for example, integrated in luminaires leveraging connected lighting infrastructure. Connected lighting systems may enable efficient management of lighting assets, optimized maintenance and energy-efficient advanced lighting controls. Moreover, connected lighting systems equipped with diverse urban sensors may offer the potential of acquiring contextual information that forms the basis for novel data-driven city services. A key source of urban information may be provided by an automatic or semi-automatic detection of predefined events or behaviors, as increasingly adopted by intelligent surveillance systems. Incident detection may support staff operating security systems to handle vast amounts of acquired data and respond adequately. However, the capabilities of most systems are often confined to detection of incidents when they occur, while prediction of relevant incidents over a meaningful time span such that precautionary measures can still be taken, represents a major challenge. Another important source of information may be represented by the number of people present in a designated area, their movement and derivative attributes. Such information may be cost-effectively acquired by monitoring the presence of connected devices such as smartphones, tablets and smart watches on the basis of the EM signals they emit e.g. Bluetooth, wifi, cellular, etc. Cumulative visitor numbers derived from these detections are widely applied for business intelligence applications, but may also be used to assist police officers or security staff in making operational decisions how to best deploy available resources. To improve situational awareness, it is proposed to combine these data sources by analyzing and aggregating the co-location of incidents either detected by sensors or reported by human operators and nearby device identifiers (IDs). Based on such data, for example, conventional footfall data may be complemented by a weighting factor indicative of the historic proximity to incidents of anonymous device ids. Without disclosing people's identities, such measures may support the identification of groups of notorious trouble makers. Law enforcement officers may thus be better informed about the composition of the crowd they monitor and use such information to better prevent actual incidents from happening.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A non-military incident prediction system, the system comprising:
a crowd detection interface for receiving a plurality of mobile device identifiers of a plurality of electronic mobile devices from a crowd detection unit, wherein the plurality of electronic mobile devices correspond to a plurality of non-military persons in a pre-determined geographic region during a time threshold;

an incident database wherein a plurality of weight factors is associated with a plurality of previously received and stored mobile device identifiers, wherein the weight factors are computed based on a proximity of associated electronic mobile devices of the previously received and stored mobile device identifiers to a position of at least one historic incident that occurred in the past;

a prediction subsystem configured for:

i) comparing the presently received mobile device identifiers and the previously received and stored mobile device identifiers to identify one or more matches between at least one of the presently received mobile device identifiers and the previously received and stored mobile device identifiers to obtain one or more weight factors associated with the presently received mobile device identifiers, wherein the one or more weight factors are obtained from an initial weight factor and a time decay factor, the one or more weight factors are periodically reduced towards a default weight factor that is different from the initial weight factor by applying the time decay factor to the one or more weight factors, the time decay factor is below the default weight factor, and each of the one or more weight factors is raised when a plurality of the received mobile device identifiers are detected in the pre-determined geographic region vicinity of an active incident, ii) totaling the one or more weight factors so as to obtain a total weight factor, iii) generating prediction data of an occurrence of the incident based on the total weight factor, wherein the prediction subsystem is further configured for modifying the total weight factor based on at least one situational weight factor, the at least one situational weight factor being further calculated based on one from the list of: weather conditions, day or night time, weekdays, period of a city event and type of a city event.

2. The system according to claim 1, wherein the incident database incorporates geographical data indicative of locations of the historic incidents, and wherein the weight factors are computed based on the geographical data.

3. The system according to claim 1, wherein the crowd detection interface obtains location data from the crowd detection unit, the location data being indicative of locations of the electronic mobile device, and wherein the prediction subsystem is configured to total the weight factors in the pre-determined geographical region.

4. The system according to claim 1, wherein the prediction subsystem is further configured for:

i) associating the default weight factor to the presently received mobile device identifiers that do not match any of the previously received and stored mobile device identifiers;

ii) totaling the weight factors of the presently received mobile device identifiers to obtain the total weight factor.

5. The system according to claim 1, wherein the prediction subsystem is further configured for generating a warning signal if a probability of the occurrence of the incident is larger than a pre-defined incident probability threshold.

6. The system according to claim 1, wherein the crowd detection interface receives the plurality of mobile device identifiers in the form of at least one selected from the list of: wireless signals emitted by the plurality of mobile devices, device MAC addresses and SSIDs of networks the device has been connected to.

7. The system according to claim 1, wherein the system comprises the crowd detection unit and wherein the crowd detection unit is a connected lighting system equipped with a plurality of sensors for receiving the plurality of mobile device identifiers.

8. The system according to claim 1, wherein the weight factors are calculated as a function of the maximum of the default weight factor and $$\left(\frac{c_r}{((x_i - x_{k,l})^2 + (y_i - y_{k,l})^2)}\right),$$

wherein $c_r$ is a spatial normalization factor, $(x_i, y_i)$ represents coordinates of a historic incident/and $(x_{k,l}, y_{k,l})$ represents coordinates of an associated electronic mobile device k.

9. The system according to claim 1, wherein the time threshold is one second.

10. A non-military incident prediction method, the method comprising:

receiving a plurality of mobile device identifiers of a plurality of electronic mobile devices, wherein the plurality of electronic mobile devices correspond to a plurality of non-military persons in a pre-determined geographic region during a time threshold;

associating a plurality of weight factors to a plurality of previously received and stored mobile device identifiers, wherein the weight factors are computed based on a proximity of associated electronic mobile devices of the previously received and stored mobile device identifiers to a position of at least one historic incident that occurred in the past, wherein each of the plurality of weight factors are obtained from an initial weight factor and a time decay factor, each of the plurality of weight factors are periodically reduced towards a default weight factor that is different from the initial weight factor by applying the time decay factor to each of the plurality of weight factors, the time decay factor is below the default weight factor, and each of the plurality of weight factors is raised when the received plurality of mobile device identifiers are detected in the pre-determined geographic region vicinity of an active incident;

comparing the presently received mobile device identifiers and the previously received and stored mobile device identifiers to identify one or more matches between at least one of the presently received mobile device identifiers and the previously received and stored mobile device identifiers so as to obtain one or more weight factors associated with the presently received mobile device identifiers;

totaling the one or more weight factors so as to obtain a total weight factor; generating prediction data presenting a probability of an occurrence of the incident based on the total weight factor.

11. A non-transitory storage medium storing a computer program product comprising instructions for causing a processor system to perform the non-military incident prediction method according to claim 10.

* * * * *